United States Patent
Lee

(10) Patent No.: US 8,282,788 B2
(45) Date of Patent: *Oct. 9, 2012

(54) EXTRACTION APPARATUS AND METHOD OF EXTRACTING ESSENTIAL OILS, ESSENCE, AND PIGMENTS FROM ODOROUS RAW MATERIAL BY MICROWAVE HEATING UNDER SUB-CRITICAL CONDITIONS

(76) Inventor: Bing-Nan Lee, Pingtung (TW)

( * ) Notice: Subject to any disclaimer, the term of this patent is extended or adjusted under 35 U.S.C. 154(b) by 635 days.

This patent is subject to a terminal disclaimer.

(21) Appl. No.: 12/467,339

(22) Filed: May 18, 2009

(65) Prior Publication Data

US 2010/0288620 A1    Nov. 18, 2010

(51) Int. Cl.
*B01D 3/34* (2006.01)
*B01D 5/00* (2006.01)
*B01D 11/00* (2006.01)
*H05B 6/64* (2006.01)

(52) U.S. Cl. ............ 202/169; 34/241; 34/259; 137/511; 137/904; 202/269; 202/168; 202/170; 210/90; 210/136; 219/678; 219/686; 422/614

(58) Field of Classification Search .............. 34/241, 34/259; 99/451, DIG. 14; 137/511, 904; 159/16.1, DIG. 26, DIG. 42; 202/168, 169, 202/170, 269; 210/90, 136; 219/678, 686; 422/614

See application file for complete search history.

(56) References Cited

U.S. PATENT DOCUMENTS

| | | | | |
|---|---|---|---|---|
| 3,192,687 | A | * | 7/1965 | Silva et al. ............. 95/26 |
| 4,317,721 | A | * | 3/1982 | Pynnonen ............. 210/120 |
| 5,002,784 | A | * | 3/1991 | Pare et al. ............. 426/241 |
| 5,427,741 | A | * | 6/1995 | Bennett ............. 422/547 |
| 5,458,178 | A | * | 10/1995 | Nakamura ............. 160/172 R |
| 5,458,897 | A | * | 10/1995 | Pare ............. 426/241 |
| 5,711,857 | A | * | 1/1998 | Armstrong ............. 202/235 |
| 5,884,417 | A | * | 3/1999 | Pare ............. 34/263 |
| 6,783,736 | B1 | * | 8/2004 | Taylor et al. ............. 422/554 |
| 2004/0129389 | A1 | * | 7/2004 | Lecoffre ............. 159/16.1 |
| 2008/0017558 | A1 | * | 1/2008 | Pollock et al. ............. 210/90 |
| 2008/0191153 | A1 | * | 8/2008 | Marganski et al. ....... 250/492.21 |

* cited by examiner

*Primary Examiner* — Virginia Manoharan

(57) ABSTRACT

The invention relates to extraction apparatus and method for obtaining essential oils and essence and pigments from odorous raw materials by microwave radiation heating under sub-critical conditions, which has advantages of easy operation, higher extracting temperature and efficiency. The microwave chamber has a power level of 100 W to 1,500 W and its microwave radiation has a frequency at 915 MHz or 2,450 MHz. The extraction process can be performed without any preheating necessary. A condenser unit is operated at temperatures between −20° C. and 15° C. for cooling the gas extractive flowing out of the extraction unit. Because both volatile aromatic compounds and pigments of the odorous raw materials can be extracted successfully, the extracted essence is colorful. Since the extraction process by microwave radiation heating is free from adding any organic solvent and/or any artificial chemical compound, the extraction apparatus and method applied are really environmentally friendly.

1 Claim, 5 Drawing Sheets

EXTRACTION APPARATUS AND METHOD OF EXTRACTING ESSENTIAL OILS, ESSENCE, AND PIGMENTS FROM ODOROUS RAW MATERIAL BY MICROWAVE HEATING UNDER SUB-CRITICAL CONDITIONS

BACKGROUND OF THE INVENTION

1. Field of Invention

The invention relates to extraction apparatus and method thereof and more particularly to an apparatus of obtaining essential oils, essence, and pigments from odorous raw materials (e.g., plant materials and Chinese medicinal herbs) by microwave heating under sub-critical conditions.

2. Description of Related Art

Distillation methods are well known in the art. A type of simple distillation method is batch distillation. Drawbacks of a batch distillation are detailed below. Vapor with volatile substances may be condensed prior to leaving the extraction cartridge due to heat loss, which results an obvious temperature decrease and a lower efficiency of extraction. Further, concentration of the volatile substances in the distillate (i.e., essence) is low since it is diluted with a large volume of water.

Other extraction methods are also well known in the art. One typical extraction apparatus is Soxhlet extractor. Drawbacks of the Soxhlet extractor include time consuming, a low reproducibility, and application of organic solvents during the extracting process.

Nowadays extraction methods including ultrasonic extraction and ultra critical extraction with carbon dioxide ($CO_2$) have been developed. Drawbacks of the ultrasonic extraction are adding of a large amount of organic solvent and time consuming during the extracting process. On the other hand, the ultra critical extraction with $CO_2$ has defects of low energy efficiency as well as its apparatus is costly.

The latest extraction method is microwave extraction by being heated with a microwave oven because microwave heating reveals less thermal resistance effect than an electrical oven doing. Though the efficiency of microwave extraction is found higher than a batch distillation, it has been focused on heating water or organic solvents at bottom layer of microwave device to generate vapor for extraction of volatile compounds. The advantages and benefits of microwave extraction have not been fully utilized as viewed by the present inventor. Thus, the need for improvement still exists.

SUMMARY OF THE INVENTION

It is therefore one object of the invention to provide an apparatus of obtaining essential oils, essence, and pigments from odorous raw materials (e.g., plant materials and Chinese medicinal herbs) by microwave heating under sub-critical conditions.

It is another object of the invention to provide a method of obtaining essential oils, essence, and pigments from odorous raw materials by microwave heating under sub-critical conditions, which has advantages of higher both extracting temperature and extracting efficiency.

The above and other objects, features and advantages of the invention will become apparent from the following detailed description taken with the accompanying drawings.

DETAILED DESCRIPTION OF THE INVENTION

Figure 1:
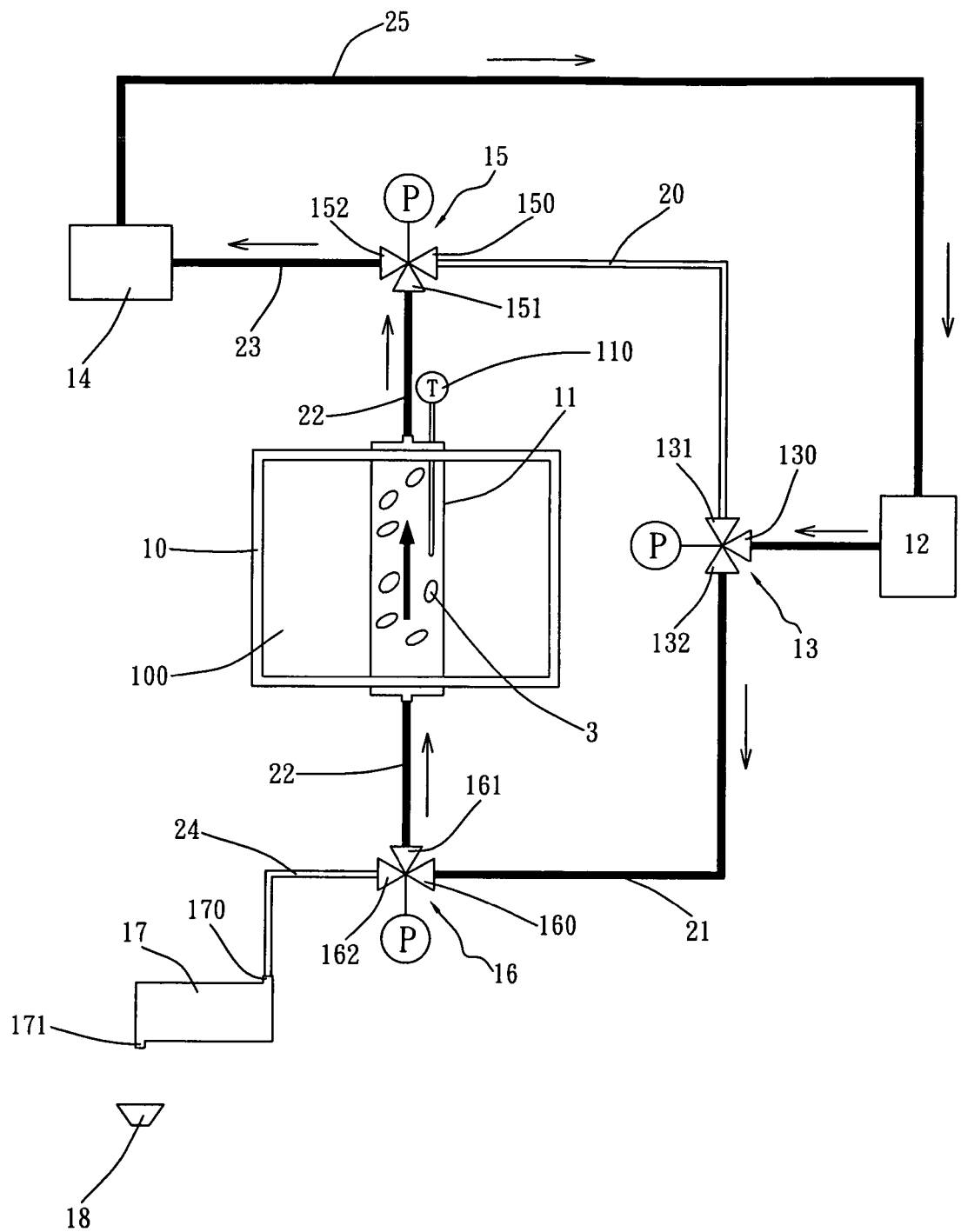
FIG. 1 is a schematic illustration of an extraction apparatus according to the invention.

Referring to FIG. 1, an extraction apparatus in accordance with the invention is shown. The apparatus comprises the following components as discussed in detail below.

A parallelepiped microwave chamber 10 comprises a heating space 100 and at least one microwave radiation source (not shown). The microwave chamber 10 is adapted to heat an object in the heating space 100 uniformly and continuously. The microwave radiation has a frequency at 915 MHz or 2,450 MHz. The microwave chamber 10 has a power level of 100 W to 1,500 W with a continuous distribution mode.

A hollow, cylindrical extraction unit 11 is made of Teflon, which is transparent to microwave radiation. The extraction unit 11 is mounted in the heating space 100. The extraction unit 11 has top and bottom openings (not numbered). Preferably, a "K-type" or a "R-type" thermal coupler 110 is mounted in the top opening of the extraction unit 11 for an apparent temperature measurement at different location simultaneously the microwave heating process is proceeding.

An inert gas supply 12 is provided for supplying inert gas such as nitrogen ($N_2$) or helium (He), which has a better chemical stability than oxygen during the high temperature extraction process. A first three-way check valve 13 comprises an inlet port 130 adapted to communicate with the inert gas supply 12, a first outlet port 131, and a second outlet port 132. The first three-way check valve 13 is adapted to control both gas pressure and flow rate in the stainless steel gas line 20 or 21 by switching and adjusting the first outlet port 131 or the second outlet port 132, respectively.

An inert gas feedback unit 14 is provided for collecting inert gas and feeding it back to the inert gas supply 12 for reuse via a stainless steel gas line 25. A second three-way check valve 15 comprises an inlet port 150 adapted to communicate with the first outlet port 131 via a stainless steel gas line 20, a first outlet port 151 adapted to communicate with the top opening of the extraction unit 11 via a stainless steel gas line 22, and a second outlet port 152 adapted to communicate with the inert gas feedback unit 14 via a stainless steel gas line 23. A third three-way check valve 16 comprises an inlet port 160 adapted to communicate with the second outlet port 132 via a stainless steel gas line 21, a first outlet port 161 adapted to communicate with the bottom opening of the extraction unit 11 via the stainless steel gas line 22, and a second outlet port 162 adapted to communicate with an inlet 170 of the condenser unit 17 via the stainless steel gas line 24. Each of the second three-way check valves 15 and the third three-way check valves 16 is adapted to a manometer 19 at its inlet.

Cooling water is continuously circulated in the condenser unit 17 for cooling the gas flow which flows out of the extraction unit 11 via a stainless steel gas line 24. Preferably, the condenser unit 17 is operated at a temperature range between −20° C. and 15° C. A collecting reservoir 18 below an outlet port 171 of the condenser unit 17 is adapted for collecting the extractive distillate.

Figure 2:
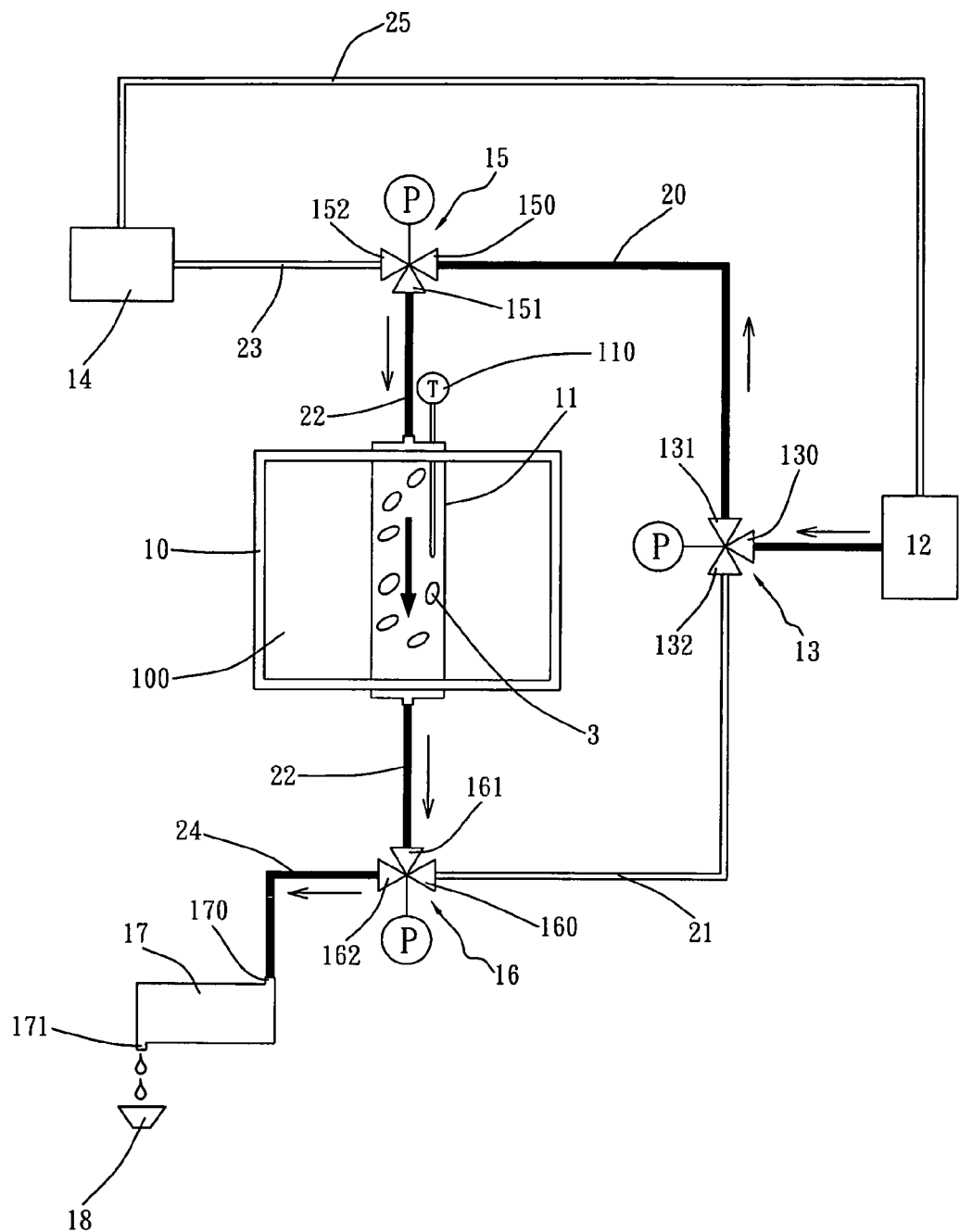
FIG. 2 is a view similar to FIG. 1 where an extraction process is illustrated.

Referring to FIG. 2 in conjunction with FIG. 1, an extraction process according to the invention is illustrated. The extraction process comprises the following steps:

Preparation in which a material 3 (e.g., flowers, leaves, stems, and Chinese medicinal herbs, etc.) is placed in the extraction unit 11. Next, the extraction unit 11 is installed in the heating space 100. One end of an upper portion of the extraction unit 11 is connected to the first outlet port 151 of the second three-way check valve 15 via stainless steel gas line 22. Another stainless steel gas line 22 is applied to connect both the first outlet port 161 of the third three-way check valves 16 and the lower portion of the extraction unit 11. The inlet port 150 and the first outlet port 131 are also joined together with the stainless steel gas line 20. Furthermore, the second outlet port 152 and the inert gas feedback unit 14 are linked together with the stainless steel gas line 23. The inlet port 160 and the second outlet port 132 are connected together with the stainless steel gas line 21. The stainless steel gas line 24 is interconnected the second outlet port 162 and the inlet port 170 of the condenser unit 17.

Exhausting step is conducted as shown in FIG. 1 in which a channel from the inlet port 130 to the second outlet port 132, a channel from the inlet port 160 to the first outlet port 161, and the second three-way valve 15 are fully opened. Pressure of the inert gas supply 12 is set between 0.11 MPa and 0.21 MPa during the exhaustion step. Next, inert gas is charged into the extraction unit 11 via the first three-way valve 13, the stainless steel gas line 21, the third three-way valve 16, and the lower portion of the stainless steel gas line 22. A channel between the first outlet port 151 and the second outlet port 152 will be fully opened to discharge air from the extraction unit 11. Hence, inert gas flows from the upper portion of the stainless steel gas line 22 to the inert gas feedback unit 14 via the second three-way check valve 15 and the stainless steel gas line 23. The exhausting step may be taken for 10 minutes or longer to drive air out of the extraction unit 11 and to keep the extraction unit 11 under a substantial inertia condition.

Charging inert gas step as shown in FIG. 2 in which a channel between the inlet port 130, the first outlet port 131, inlet port 150 and the second outlet port 151 is opened, and the third three-way valve 16 is fully closed. Pressure of the inert gas supply 12 is set between 0.15 MPa and 0.28 MPa during the charging inert gas step. Next, inert gas is charged into the extraction unit 11 via the first three-way check valve 13, the stainless steel gas line 20, the third three-way check valve 15, and the upper portion of the stainless steel gas line 22.

Heating step in which the microwave chamber 10 is turned on to heat the heating space 100 for 5 to 150 min. Temperature of the heating space 100 will increase and reach to a range between 120° C. and 285° C. as a result of being heated by microwave radiation for 8 min and longer. Water content of the material 3 will be vaporized during the heating period by microwave radiation. Moreover, the fragrant extractive gas which contains both inert gas and vapor in the extraction unit 11 may expand simultaneously due to a higher temperature. A channel between the first outlet port 161 and the second outlet port 162 will be opened if the pressure of the fragrant extractive gas in the extraction unit 11 has reached the predetermined operating pressure (e.g. 0.21 MPa to 7.00 MPa) of the third three-way check valve 16. Hence, the fragrant extractive gas flows into the condenser unit 17 via the lower portion of the stainless steel gas line 22, the third three-way check valve 16, and the stainless steel gas line 24.

Cooling step in which cooling water is continuously circulating through the condenser unit 17 and the fragrant extractive gas will be condensed. Finally, the distillate flows out of the condenser unit 17 through the outlet 171 and is collected by the collecting reservoir 18.

The invention has the following advantages:

The extracting components associated with the microwave radiation heating under a sub-critical condition are simple and is easy to be controlled. The extraction process by microwave radiation heating can be stopped or restarted at any time.

Both volatile aromatic compounds and pigments of the raw materials 3 which have a higher boiling point can be extracted successfully by the microwave radiation heating process under a sub-critical condition. As a result, the extractive is colorful.

The extraction unit 11 is preferably filled with inert gas such as nitrogen ($N_2$) or helium (He) before the extraction process begins. This is because oxygen present in the extraction unit 11 may adversely affect chemical stability of the extractive.

The extractives obtained both by the invention method and by the typical batch distillation are further examined by a GC-MS (gas chromatography-mass spectrometry) to compare their contents. It is found that the extractives by the invention method exhibit a fragrant degree about 500 to 800 times higher than those obtained by the typical batch distillation. Therefore, the invention has a high economic value.

Since the extraction process by microwave radiation heating can be performed without any preheating necessary or any addition of organic solvent, the apparatus and method of extraction implemented in the invention herein are really environmentally friendly.

Figure 3A:
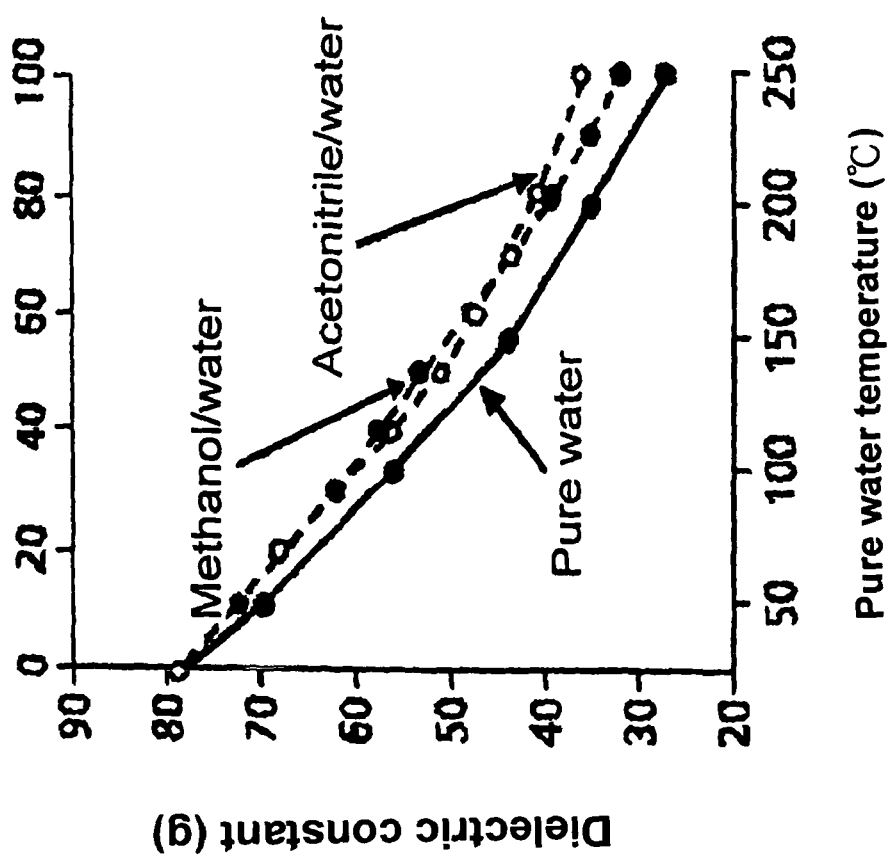
FIG. 3A plots dielectric constant versus pure water temperature for pure water, methanol/water, and acetonitrile/water.
Figure 3B:
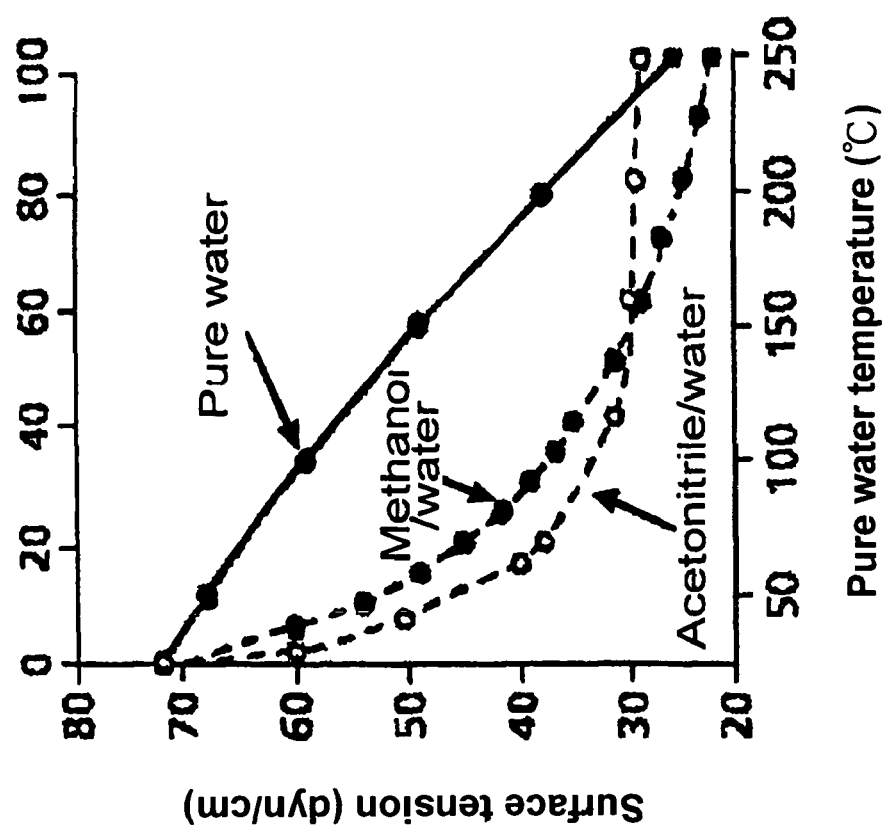
FIG. 3B plots surface tension versus pure water temperature for pure water, methanol/water, and acetonitrile/water.
Figure 3C:
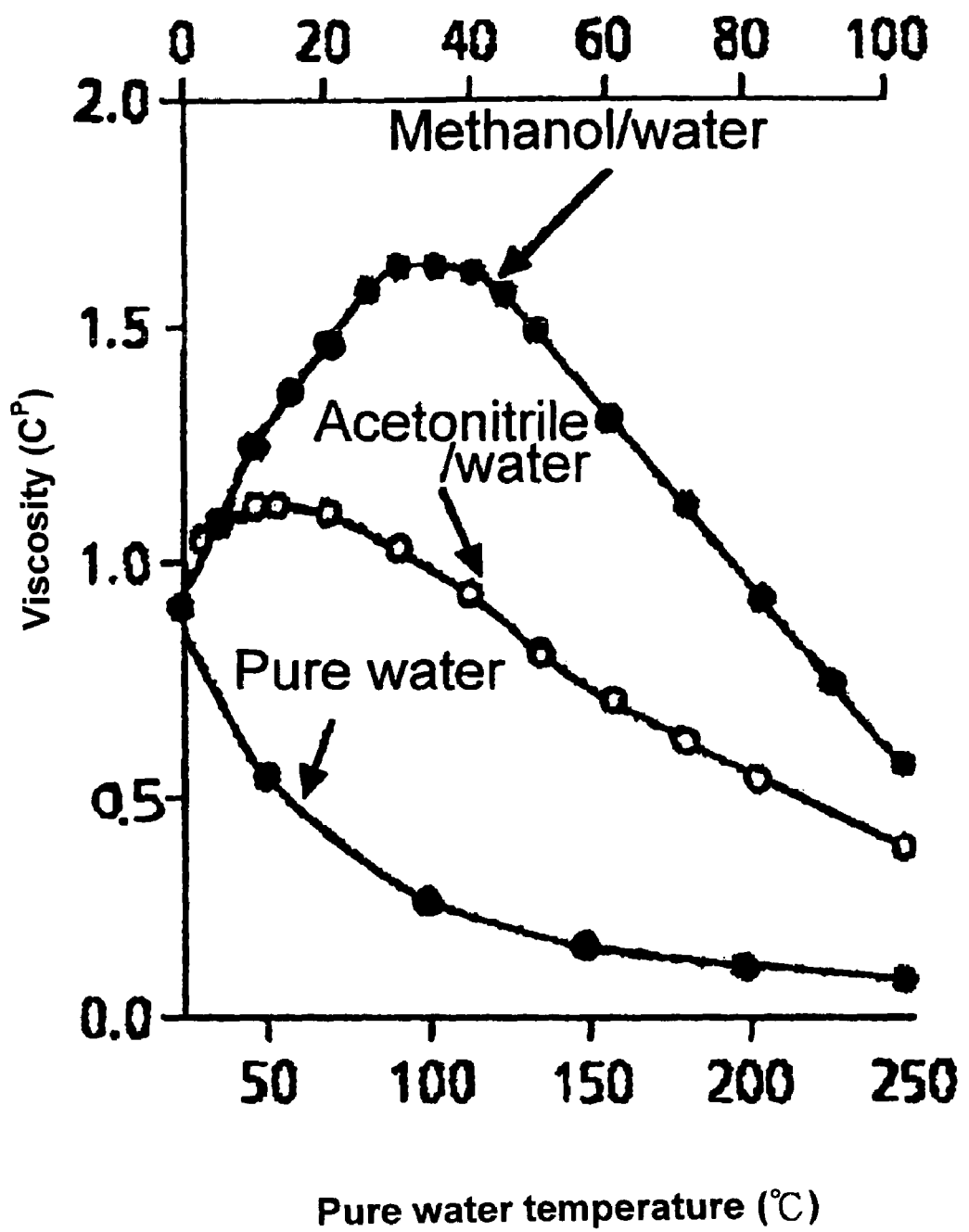
FIG. 3C plots viscosity versus pure water temperature for pure water, methanol/water, and acetonitrile/water.

Referring to FIGS. 3A, 3B, and 3C, three comparison graphs regarding pure water temperature versus each of dielectric constant, surface tension, and viscosity for pure water, methanol/water, and acetonitrile/water are shown respectively. It is found that extraction performance of pure water is higher than that of water with methanol or acetonitrile in a high temperature high pressure sub-critical state.

Control of (a) dielectric constant, (b) surface tension, and (c) viscosity by changing temperature with pure water at 50 bar compared with water mixed with methanol or acetonitrile at 25° C. FIGS. 3A, 3B, and 3C are quoted from Y. Yang et al., J. Chromatogr. A, 810 149-159(1998).

The top to bottom path of inert gas charging and the extraction process be performed under a sub-critical condition result a fully vaporize water content of the odorous raw materials (3) simultaneously. This is contrary to the typical batch distillation in which vapor with volatile substance condensates prior to reaching the condenser because its temperature decreases definitely. Hence, the invention is more effective in the extraction of essential oils, essence, and pigments from the odorous raw materials 3.

A plurality of extraction units can be employed with several merits, such as a reduction of extraction time, mass of raw material can be extracted simultaneously, and a promotion of extraction efficiency, etc. Furthermore, energy saving is seen significantly.

While the invention herein disclosed has been described by means of specific embodiments, numerous modifications and variations could be made thereto by those skilled in the art without departing from the scope and spirit of the invention set forth in the claims.

What is claimed is:

1. An extraction apparatus for obtaining essential oils, essence, and pigments from plant raw materials comprising:
   a microwave chamber comprising a plurality of pairs of top and bottom openings;

a plurality of extraction units filled with a plant raw material, each of the extraction units comprising top and bottom openings secured to the top and bottom openings of the same pair of the microwave chamber respectively;

a gas supply for supplying inert gas flow into the extraction units via stainless steel gas lines;

a first three-way check valve comprising an inlet port communicating with the gas supply, a first outlet port, and a second outlet port;

a second three-way check valve comprising an inlet port communicating with the first outlet port of the first three-way check valve, a first outlet port communicating with the top opening of each of the extraction units, and a second outlet port;

a third three-way check valve comprising an inlet port communicating with the second outlet port of the first three-way check valve, a first outlet port communicating with the bottom opening of each of the extraction units, and a second outlet port;

a condenser comprising an inlet communicating with the second outlet port of the third three-way check valve, and an outlet; and inert gas feedback means having one end connected to the second outlet port of the second three-way check valve and the other end connected to the gas supply, wherein the plant raw material in the form of vapor flows out of the extraction units into the condenser via the third three-way check valve, cooling water is continuously circulated through the condenser to condense the vapor to obtain extractives containing essential oils, essence, and pigments, and the extractives flow out of the condenser.

* * * * *